United States Patent [19]

Risse

[11] Patent Number: 5,563,109
[45] Date of Patent: Oct. 8, 1996

[54] PROCESS FOR THE MANUFACTURE OF CATALYTICALLY ACTIVE GAS DIFFUSION ELECTRODES

[75] Inventor: Friedhelm Risse, Köln, Germany

[73] Assignee: Compur Monitors Sensor Technology, Munich, Germany

[21] Appl. No.: 289,643

[22] Filed: Aug. 12, 1994

[30] Foreign Application Priority Data

Aug. 13, 1993 [DE] Germany .......................... 43 27 254.1

[51] Int. Cl.$^6$ ........................................................ B05D 5/12
[52] U.S. Cl. .............................. 502/101; 502/4; 427/124; 427/125; 427/282; 427/296; 427/404; 429/42
[58] Field of Search .................... 502/101, 4; 427/282, 427/125, 404, 124, 259, 296; 429/42

[56] References Cited

U.S. PATENT DOCUMENTS

| | | | |
|---|---|---|---|
| 3,442,715 | 5/1969 | Yee et al. .............................. | 502/101 X |
| 4,185,131 | 1/1980 | Goller et al. .......................... | 427/125 X |
| 4,248,682 | 2/1981 | Lindstrom et al. ................... | 429/27 X |
| 4,319,969 | 3/1982 | Oda et al. ............................. | 427/282 X |
| 5,330,860 | 7/1994 | Grot et al. ................................ | 429/42 |

*Primary Examiner*—Fred Teskin
*Attorney, Agent, or Firm*—Cohen, Pontani, Lieberman, Pavane

[57] ABSTRACT

A process for producing a catalytically active gas diffusion electrode, in which process a gas-permeable membrane is first covered by a structuring mask which has recesses in accordance with the planned electrode surfaces. Next, through vapor deposition or cathodic sputtering of a conductive substance in a vacuum, a conductive electrode pattern structured in accordance with the recesses is produced on the membrane. After this, the conductive electrode pattern located on the membrane is galvanically coated with the catalyst by electrolytic deposition and then made hydrophobic.

5 Claims, 1 Drawing Sheet

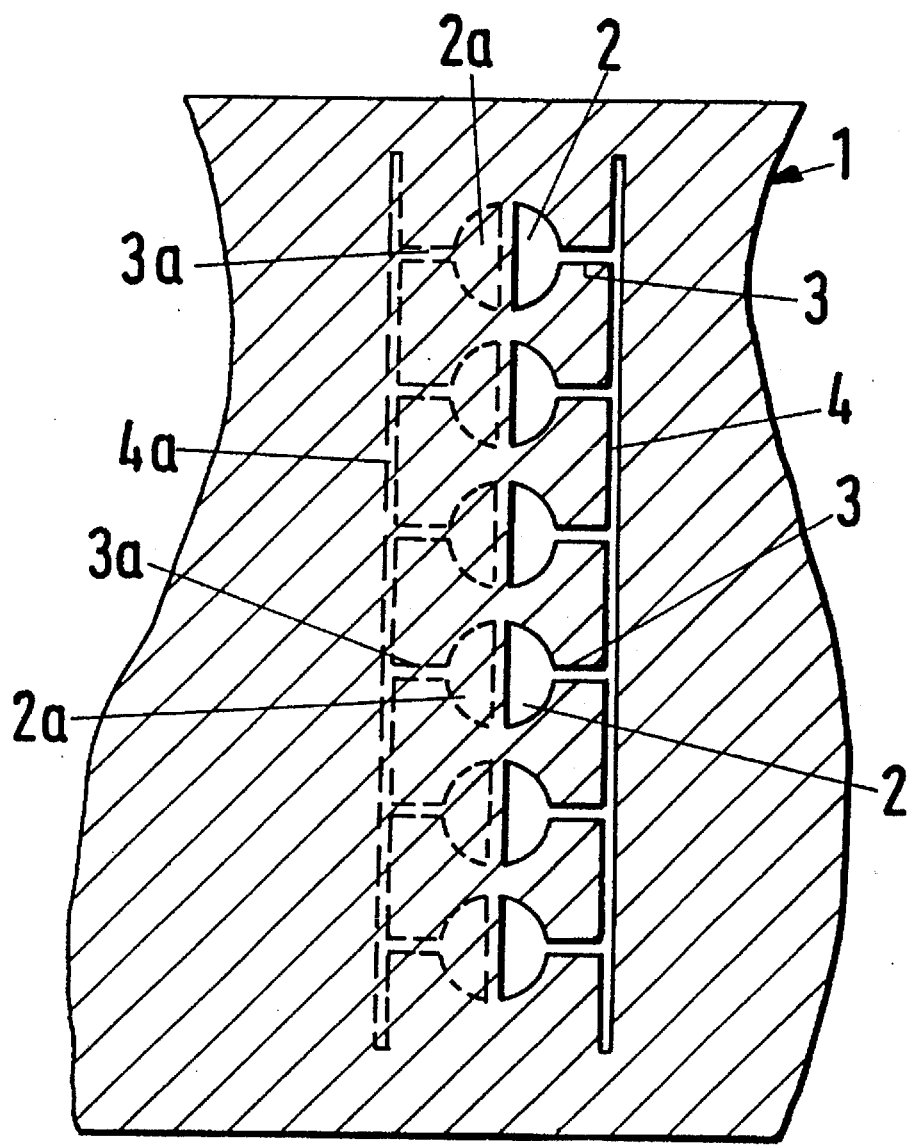

PROCESS FOR THE MANUFACTURE OF CATALYTICALLY ACTIVE GAS DIFFUSION ELECTRODES

BACKGROUND OF THE INVENTION

1. Field of the Invention

The invention relates to a process for manufacturing catalytically active gas diffusion electrodes for electrochemical cells, in which a gas-permeable membrane is coated with a catalyst.

2. Discussion of the Prior Art

In electrochemical gas sensors for environmental and worker protection, large numbers of gas diffusion electrodes coated with catalysts are used for quantitative electrochemical conversion and thus for the measurement of trace gases in the PPM and PPB range.

Various mechanical, electrochemical and chemical methods of manufacturing electrodes for electrochemical sensors are known. However, all of the previously known methods have the disadvantage of being extremely labor-intensive and result in an unacceptably large variation among products in respect to the sensor specifications (sensitivity, temperature dependence, ageing stability, etc.). In addition, it is unavoidable during production of the electrodes that an undesirably large share of the expensive catalytic material is lost.

SUMMARY OF THE INVENTION

Accordingly, it is an object of the present invention to provide a process for the production of catalytically active gas diffusion electrodes which ensures high reproducibility and very good homogeneity of the catalytic coating. In addition, the process is to be realizable, in respect to automation, with the lowest possible labor expenditure and to be suitable for the production of gas diffusion electrodes with variously coated catalytic fields.

Pursuant to this object, and others which will become apparent hereafter, one aspect of the present invention resides in a method in which the membrane is covered with a structuring mask which is provided with openings in accordance with the planned electrode surfaces. A conductive electrode pattern structured in accordance with the openings is produced on the membrane through vapor deposition or cathodic sputtering of a conductive substance in a vacuum. The conductive electrode pattern on the membrane is then galvanically coated with the catalyst. Finally, the galvanically deposited, catalytically active electrode pattern is made hydrophobic.

The catalytically active layer pattern is preferably made hydrophobic by the application and subsequent drying of a polymer dispersion.

According to a further embodiment of the invention, various partial electrode surfaces of the electrode pattern are galvanically coated with various catalysts.

The process according to the invention makes possible a cost-effective mass production of gas diffusion electrodes with high reproducibility. At the same time, the consumption of catalytic material is reduced considerably, compared to conventional processes. Furthermore, the inventive process opens the way to efficient production of multiple electrodes with various catalysts.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The drawing shows a top view of a structuring mask for use in the inventive method.

DETAILED DESCRIPTION OF THE PREFERRED EMBODIMENTS

As seen in the drawing, the structuring mask consists of a thin metal sheet 1, into which semicircular cutouts 2, bar-shaped openings 3 and a continuous slit 4 are stamped. The bar-shaped openings 3 are connected to the continuous slit 4. The cutouts 2 are shaped to correspond to the desired electrode forms. The gas-permeable membrane used for the production of the gas diffusion electrode, e.g., a PTFE film, is subsequently covered with the structuring mask 1 and is placed into a vacuum apparatus. The membrane is then coated by vapor-deposition with a conductive layer, e.g., with gold. Instead of vapor deposition, sputtering can also be used to apply the conductive layer. In this way, a conductive electrode pattern structured in accordance with the cutouts is obtained on the membrane. After this, the structuring mask is removed and the membrane with the electrode pattern is placed in an electrolytic bath. The electrolytic bath consists, for example, of a hydrous $H_2PtCl_6$ solution. A negative electrical voltage is applied in the electrolytic bath via the connecting bars associated with the openings 3, 4, so that a cathodic deposit of platinum occurs. The electrolytic current strength lies in the range of 10 µA to 100 µA. In this way, all sites on the membrane on which gold has been deposited which correspond to the cutouts 2 and the openings 3, 4, are galvanically coated with platinum as a catalyst.

In order to manufacture round electrodes that consist of two halves, the membrane can be covered anew with the structuring mask 1, whereby the mask is placed upon the membrane after having been rotated by 180°, as indicated in the drawing (top side and bottom side reversed), so that the cutouts and openings 2a, 3a, 4a, shown by broken lines, are now accessible for deposit. An electrode pattern is then obtained that is electrically and spatially separate from the first electrode pattern and is arranged in a mirror-image, whereby the semicircular partial electrodes corresponding to the cutouts 2 and 2a are insulated by a narrow bar. It is now possible, using an electrolytic bath of a different composition, to galvanically coat the electrode fields produced in the second deposit step and corresponding to the cutouts 2a with a different catalyst. In this way, it is feasible to produce electrically insulated partial electrodes efficiently and under relatively simple production conditions. This is true in particular for three-electrode and multi-electrode sensors, whereby this manufacturing method allows sensors of this type to be significantly reduced in size or to be subdivided to a much greater extent than would be possible with manual production.

The membrane with the catalytically active electrode pattern produced in this manner is then made hydrophobic by being moistened with a polymer dispersion e.g., a TEFLON (PTFE) dispersion, and then dried. The known mechanical methods of producing gas diffusion electrodes also employ this type of hydrophobization. The catalytically active layer must be made hydrophobic in order to prevent the gas diffusion electrode from being flooded by the electrolyte after being installed in an electrochemical sensor. In such an event, the 3-phase boundary responsible for the gas conversion and thus for the electrochemical evidence of the gas components to be measured could no longer be formed. In the final step, the finished individual electrodes are stamped out of the membrane.

Through the electrochemical deposition of the catalytically active layer on the membrane, the consumption of catalytic material is reduced and, at the same time, a more even coating and thus less variation in finished products (higher reproducibility) is achieved. Because the catalyst to be separated is ionized in the solution and is galvanically deposited through the application of a voltage, it is possible to maintain defined production conditions for the electrodes. In contrast, the manual, mechanical coating of an electrode with catalytic powder, e.g., platinum black, which has been standard until now, has the disadvantage that the physical characteristics of the electrodes frequently depend in a non-reproducible way on the nature of the platinum black and the manner in which it was produced. The combination of vapor deposit through masks and electrolytic deposit also allows a clear reduction in size of the electrode surfaces, analogous to miniaturization in semi-conductor technology. The electrolyte and the catalytic material necessary for a sensor thus can also be significantly reduced.

The invention is not limited by the embodiments described above which are presented as examples only but can be modified in various ways within the scope of protection defined by the appended patent claims.

I claim:

1. A process for manufacturing catalytically active gas diffusion electrodes for electrochemical cells, comprising the steps of: providing a gas-permeable membrane; covering the membrane with a structuring mask which has openings corresponding to planned electrode surfaces; producing a conductive electrode pattern on the membrane corresponding to the openings; galvanically coating the conductive electrode pattern on the membrane with a catalyst; and making the galvanically deposited, catalytically active electrode pattern hydrophobic.

2. A process as defined in claim 1, wherein the step of making the electrode pattern hydrophobic including applying and subsequently drying a polymer dispersion on the catalytically active electrode pattern.

3. A process as defined in claim 1, including galvanically coating various partial electrode surfaces of the electrode pattern with various catalysts.

4. A process as defined in claim 1, wherein the step of producing a conductive electrode pattern on the membrane includes vapor deposition of a conductive substance in a vacuum.

5. A process as defined in claim 1, wherein the step of producing a conductive electrode pattern on the membrane includes cathodic sputtering of a conductive substance in a vacuum.

* * * * *